No. 779,083. PATENTED JAN. 3, 1905.
W. J. JAMISON.
ARTIFICIAL BAIT.
APPLICATION FILED APR. 18, 1904.

Witnesses:
Harry R. Lewhite
Ray White

Inventor
William J. Jamison,
By Charles W. Hill Atty.

No. 779,083.

Patented January 3, 1905.

UNITED STATES PATENT OFFICE.

WILLIAM J. JAMISON, OF CHICAGO, ILLINOIS.

ARTIFICIAL BAIT.

SPECIFICATION forming part of Letters Patent No. 779,083, dated January 3, 1905.

Application filed April 18, 1904. Serial No. 203,656.

*To all whom it may concern:*

Be it known that I, WILLIAM J. JAMISON, a citizen of the United States, and a resident of Chicago, Cook county, Illinois, have invented certain new and useful Improvements in Artificial Bait; and I do hereby declare that the following is a full, clear, and exact description of the same, reference being had to the accompanying drawings, and to the letters of reference marked thereon, which form a part of this specification.

This invention relates more particularly to fish-bait adapted for casting purposes. Heretofore of the various forms of bait or fish-lures in use many attempts have been made to provide a surface bait which, while serving as an effective lure for the fish, is not likely to become entangled in weeds or the like floating at or near the surface of the water.

Of the devices of the kind many are complicated and others are so constructed as to readily foul in weeds or grass, thus interfering with the sport.

The object of this invention is to provide a very simply, cheaply, and durably constructed fish bait or lure adapted for casting or trolling purposes and so constructed as to preclude possibility of entanglement in floating grass or weeds should the same be present.

It is also an object of this invention to provide a device that will move in a lifelike manner upon and in the water when impelled by the line, as well as providing a lifelike appearance when in the air during a cast and before striking the water.

It is also an object of the invention to provide additional and readily-detachable hooks adapted to be secured at will upon the bait or removed therefrom and designed for use more particularly when casting in water free from weeds, at which time the bait may be used as an under-surface bait.

The invention embraces many novel features; and it consists in the matters hereinafter described, and more fully pointed out and defined in the appended claims.

Figure 1:
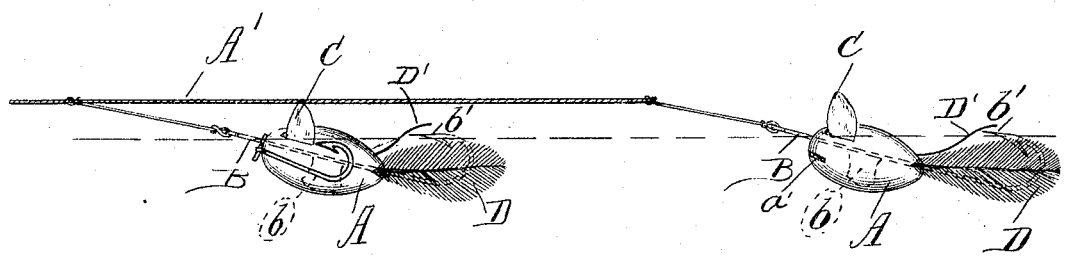
Figure 2:
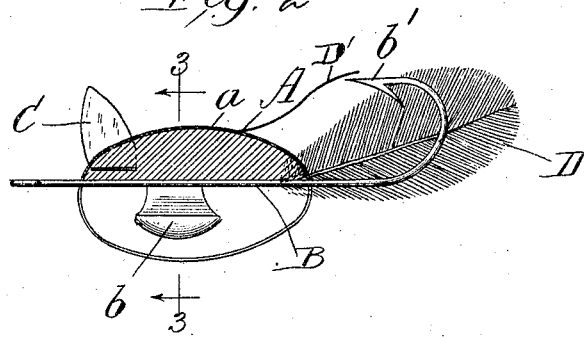
Figure 4:
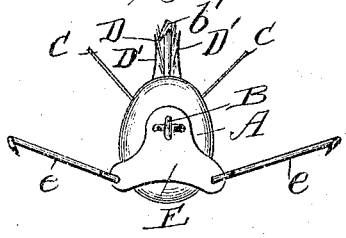
Figure 3:
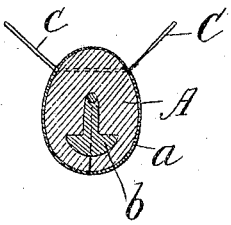

In the drawings, Figure 1 is a side elevation of a line end having secured thereon two baits or lures embodying my invention, on one of which is shown the detachable hooks. Fig. 2 is an enlarged longitudinal section of the bait. Fig. 3 is a section taken on line 3 3 of Fig. 2. Fig. 4 is a front elevation of the bait, showing the removable hooks in place.

As shown in said drawings, the bait comprises a light float A, of cork or other suitable material, which is constructed of an oval shape having a somewhat-blunted front end, as shown in Fig. 2. Said float, as shown, is slit longitudinally on its under side for a part of its thickness and is partly hollowed out to receive a depending weight $b$, which is soldered or otherwise secured to the shank of a fish-hook B, the barb $b'$ of which is directed upwardly. When the shank and the weight are properly bedded in the float A, the slit portion is pressed together and secured by water-glue, cement, or in any other suitable manner, and a waterproof enamel $a$, usually white or some bright color, is applied to the float, rendering the same impervious to water. Prior, however, to the application of said enamel a horizontal longitudinal slit is made near the front end of the float above the shank and a relatively stiff strip of bright-colored flannel or other suitable material is drawn therethrough, the ends C extending either horizontally outwardly therefrom or inclining upwardly, as shown in Fig 3. Said wings C may also, if preferred, be treated with a waterproof material to render the same less flexible in water and may of course be of any size, material, or conformation.

At the rear end or the tail of the bait bright-colored feathers D are inserted in the float, one or more on each side of the hook, and are trimmed or shaped to lie flat against and to conceal or partly conceal the barb. Rigidly engaged in the float in front of said barb are the upwardly and rearwardly directed weed-deflectors D' D', as shown, comprising resilient pieces of wire or other suitable material, one end of which is rigidly engaged in the float and the free ends of which are directed rearwardly above and in close relation to the point of the hook and act to deflect any weeds from the hook that may succeed in getting above the bait.

When it is desired to use the bait as a submerged or under-surface bait, an additional weight may be applied thereto, or baits which are weighted heavier than those designed to operate on the surface may be used, or, if preferred, weight may be augmented sufficiently by the addition of a removable hook, one on each side the bait, to cause the bait to sink. This construction is illustrated in Figs. 1 and 4, in which, as shown, is a piece of metal of any desired thickness or weight (indicated by E) and slotted centrally to slip over the eye of the hook. Said piece of metal extends laterally on each side of said shank approximately in alinement with the sides of the float, and a hook $e$ engages in the apertured ends of said lateral extension and lies along the float, as shown more fully in Fig. 1, a part of the shank thereof resting in a suitable notch in the side of the float.

The operation is as follows: One or more of said baits being secured on the line in any convenient manner the gravity of the weight causes the bait to assume a position such as shown in Fig. 1, with the wings distended upon or slightly above the surface of the water and the hook inclined upwardly, the eye thereof extending slightly above the surface of the water at the front end and at the rear, the point of the hook also extending to or above the surface indicated by dotted lines. Reeling in the line A' causes the bait to move forward in a very natural and lifelike manner, the somewhat flat front end of the float causing the same to disturb the water considerably and causing a slight upward jet to be formed. Should weeds be encountered, the oval form of the float permits the same to be drawn safely over said weeds, the counterweight $b$ holding the float at all times in its normal upright position with the hook directed upwardly beyond possibility of contact with said weeds. Should, however, any weeds succeed in getting above the bait, the deflectors D' D' direct the same safely above and beyond the hook. Said deflectors being resilient and the free ends thereof in close relation to the point of the hook, they are readily depressed when a fish takes the hook. On casting into weeds any desired number of casts may be made without the slightest difficulty, thus obviating the annoying experience of many using other forms of bait who owing to the disturbance of the weeds caused by fouling the bait must cast in a different place at almost every throw. Should the water be free from weeds and of reasonable depth, the side hook may be quickly secured in place by slipping the eye of the hook through the aperture in the plate E, which fits closely on the head of the float, in which event the outwardly and rearwardly directed hook resemble the legs of a swimming insect.

Instead of cork or wooden floats a hollow shell or metallic float may be substituted and counterweighted either on the shank of the hook, or the counterweights may be secured to the float itself in any manner adapted to hold the bait at all times in its normally operative position.

While I have described the construction embodying my invention, it is to be understood that I do not purpose limiting the invention to the details of construction and operation herein shown and described other than as stated in the claims and necessitated by the prior art, as obviously many details of construction may be varied without departing from the principles of this invention.

I claim as my invention—

1. A bait comprising a float and a rearwardly-extended hook therein having its point directed forwardly and upwardly, and a counterweight acting to hold said float upright with the point of the hook in close proximity to the surface of the water.

2. A casting-bait adapted to simulate life while in the air and on the water comprising a float, a hook thereon, and means acting normally to hold the point of the hook directed upwardly above the water.

3. A bait comprising an oval float having a weight therein, a hook-shank extending therethrough with the hook directed oppositely from the weight, stiff laterally-directed wings on each side the float and bright-colored material on each side of and concealing the hook.

4. A bait weighted to hold the hook directed upwardly at or near the surface of the water, bright wings on each side the float and removable hooks adapted to lie on each side the bait.

5. A cork float, oval in shape and slit longitudinally, a weight in the bottom thereof, a hook extending through the float and attached to the weight, said float being closed about the weight and hook-shank and enameled, and feathers lying flat against and concealing the hook.

6. A bait comprising an oval float, a weight in the bottom thereof, a hook engaged on said weight and extending through the float with the point thereof directed oppositely from said weight and a weed-deflector engaged on the float and projecting beyond the point of the hook.

7. A bait comprising an oval float provided with a longitudinal slit in the bottom thereof, a hook in said slit, a weight thereon concealed in the lower part of the float, bright wings on each side of the float and weed-deflectors adapted to protect the point of the hook.

8. A device of the class described comprising a float, a hook extending longitudinally thereof with the point directed upwardly therefrom, a weight on said hook directed toward the bottom of the float, bright-colored material on each side the hook and concealing the same, weed-deflectors engaged in the float and projecting over the point of the hook and laterally-disposed wings on said float.

9. A bait comprising a float, a hook thereon, means on said float adapted to protect the point of said hook and a counterweight acting to normally hold the point of the hook upwardly above the surface of the water.

10. A bait comprising an oval float, a hook thereon, and means adapted to normally direct the point of the hook upwardly and resilient means adapted to prevent weeds or the like from catching said hook.

11. A bait comprising a shell, a hook thereon, a weight adapted to direct the point of the hook upwardly, means on said shell adapted to protect the point of the hook, means for concealing the hook and bright-colored wings on said shell.

12. A bait comprising a hollow float, a hook projecting therethrough and a weight in the hollow of said float adapted to direct the point of the hook upwardly.

13. A bait comprising a hollow float, a hook engaged therein, a weight in the hollow of said float adapted to direct the point of the hook upwardly and a weed-deflector rigidly engaged on said float.

14. A bait comprising an oval recessed float, a hook extending longitudinally therethrough, a counterweight in said recess adapted to hold the point of the hook above the surface of the water, a weed-deflector and a pair of wings on said float.

In testimony whereof I have hereunto subscribed my name in the presence of two subscribing witnesses.

WILLIAM J. JAMISON.

Witnesses:
C. W. HILLS,
W. W. WITHENBURY